(12) United States Patent
Hamadani et al.

(10) Patent No.: US 12,175,882 B2
(45) Date of Patent: *Dec. 24, 2024

(54) HANDS-ON LABORATORY AND DEMONSTRATION EQUIPMENT WITH A HYBRID VIRTUAL/AUGMENTED ENVIRONMENT, ALONG WITH THEIR METHODS OF USE

(71) Applicant: The Trustees of the California State University, Long Beach, CA (US)

(72) Inventors: Kambiz Hamadani, San Marcos, CA (US); Ali Ahmadinia, San Marcos, CA (US); Xin Ye, San Marcos, CA (US); Yuanyuan Jiang, San Marcos, CA (US)

(73) Assignee: The Trustees of the California State University, Long Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/217,927

(22) Filed: Jul. 3, 2023

(65) Prior Publication Data

US 2023/0351919 A1    Nov. 2, 2023

Related U.S. Application Data

(63) Continuation of application No. 16/384,134, filed on Apr. 15, 2019, now Pat. No. 11,694,575.

(Continued)

(51) Int. Cl.
*G09B 23/28* (2006.01)
*G06T 19/00* (2011.01)
*G09B 19/00* (2006.01)

(52) U.S. Cl.
CPC ............ *G09B 23/28* (2013.01); *G06T 19/006* (2013.01); *G09B 19/00* (2013.01)

(58) Field of Classification Search
CPC ........ G09B 23/28; G09B 19/00; G06T 19/00; G06T 19/006
See application file for complete search history.

(56) References Cited

U.S. PATENT DOCUMENTS

| | | | | |
|---|---|---|---|---|
| 2012/0280988 A1* | 11/2012 | Lampotang | .......... | G09B 23/285 434/262 |
| 2013/0323700 A1* | 12/2013 | Samosky | ............... | G09B 23/30 434/262 |
| 2018/0190030 A1* | 7/2018 | Wu | ........................ | G09B 19/00 |

* cited by examiner

*Primary Examiner* — Timothy A Musselman
(74) *Attorney, Agent, or Firm* — Sandra Poteat Thompson; Finlayson Toffer Roosevelt & Lilly LLP

(57) ABSTRACT

Systems and methods for utilizing laboratory equipment in a hybrid reality environment or augmented virtual reality environment, are contemplated herein and include: at least one piece of laboratory equipment having at least one feature, wherein the at least one piece of laboratory equipment is tracked; a tracking module for tracking a position and an orientation of the at least one piece of tracked laboratory equipment; a virtual model, stored in a memory, comprising at least one 3-D virtual representation of the at least one feature of the at least one piece of laboratory equipment; and an experimentation module. A piece of laboratory equipment for use in a hybrid reality environment or augmented virtual reality environment is also included that comprises at least one piece of laboratory equipment having at least one feature, wherein the at least one piece of laboratory equipment is tracked; at least one marker that is coupled with the at least one piece of laboratory equipment; and a tracking module for tracking a position and an orientation of the at least one piece of tracked laboratory equipment, wherein the tracking module accesses the at least one marker.

3 Claims, 6 Drawing Sheets

Related U.S. Application Data

(60) Provisional application No. 62/657,771, filed on Apr. 14, 2018.

| Method | Spatial Resolution (mm) | Temporal Resolution/ Latency (ms) | Issues | Used By |
|---|---|---|---|---|
| Wireless tracking | 5-30 XYZ | 5 | Wireless Interference | Indotraq |
| Acoustic tracking | 2-10 XYZ | 30 | | Logitech |
| Magnetic tracking | 2-10 XYZ | 5 | Metal Interference | Razor Hydra/Sixense |
| cell-phone IMU-based tracking (inside-out) | 10-50 XYZ | 100 | Drift | Alt, Xsense, Perception Neuron, Google cardboard, Samsung Gear VR, Google Daydream View, Oculus Go, Oculus Quest, Lenovo Mirage Solo, HTC Vive Focus, HTC Vive Cosmos |
| optical-markers-passive IR retroreflector w cameras | 0.3 XYZ | 40 | Camera cost | Optitrack, Vicon |
| optical-markers-active-IR emitters w cameras | 0.5 XYZ | 4-40 | | Oculus Rift, Oculus Touch, Nintendo's Wii Nunchucks |
| optical-markers-active-RGB emitters w cameras | 1 XYZ | 18 | | Sony Playstation VR |
| optical-markers-active-IR sensor w structured/modulated laser excitation | 0.5 XYZ | 7-15 | | HTC Vive, HTC Vive Pro, Vive Controller, Vive Tracker |
| optical-markerless-structured cw laser illumination w camera | ~2-40 Z | 100 | | Kinetic 1 |
| optical-markerless-time of flight phase modulated illumination w camera | ~1-2 Z | 100 | | Kinetic 2 |
| optical-markerless-object recognition w cameras and IR emitters | 2-10 XYZ | 20 | | Leap Motion, Hololens, Meta 2, Google Worldsense/Lenovo Mirage |

| A system for utilizing laboratory equipment in a hybrid reality environment 600, includes: | at least one piece of laboratory equipment 610 having at least one feature, wherein the at least one piece of laboratory equipment is tracked a tracking module 620 for tracking a position and an orientation of the at least one piece of tracked laboratory equipment a virtual model 630, stored in a memory, comprising at least one 3-D virtual representation of the at least one feature of the at least one piece of laboratory equipment an experimentation module 640 that:

accesses 650 the virtual model stored in the memory receives 660 input from the tracking module regarding the position and the orientation of the at least one piece of tracked laboratory equipment determines 670, based on the input from the tracking module, a corresponding interaction between the at least one piece of laboratory equipment and at least one additional piece of laboratory equipment, at least a portion or part of a user, or a combination thereof determines 680 a consequence of the corresponding interaction; and renders 690, to a display, a hybrid representation comprising a particular set of the at least one 3-D virtual representation, at least a part or portion of the user, the corresponding interaction, the consequence of the corresponding interaction, or a combination thereof

Figure 7

| A system for utilizing laboratory equipment in a hybrid reality environment 700, includes: |

| at least one piece of laboratory equipment 710 having at least one feature, wherein the at least one piece of laboratory equipment is tracked |

| a tracking module 720 for tracking a position and an orientation of the at least one piece of tracked laboratory equipment |

| a virtual model 730, stored in a memory, comprising at least one 3-D virtual representation of at least one feature of an additional piece of laboratory equipment, at least a portion of a part of a user, or a combination thereof |

| an experimentation module 740 that: |

| accesses 750 the virtual model stored in the memory |

| receives 760 input from the tracking module regarding the position and the orientation of the at least one piece of tracked laboratory equipment |

| determines 770, based on the input from the tracking module, a corresponding interaction between the at least one piece of laboratory equipment and at least one additional piece of laboratory equipment, at least a portion or part of a user, or a combination thereof |

| determines 780 a consequence of the corresponding interaction; and |

| renders 790, to a display, a hybrid representation comprising the physical visual representation of the at least one piece of tracked laboratory equipment, at least one 3-D virtual representation, at least a part or portion of the user, the corresponding interaction, the consequence of the corresponding interaction, or a combination thereof |

HANDS-ON LABORATORY AND DEMONSTRATION EQUIPMENT WITH A HYBRID VIRTUAL/AUGMENTED ENVIRONMENT, ALONG WITH THEIR METHODS OF USE

This United States Utility patent application claims priority to U.S. Provisional Patent Application Ser. No. 62/657,771, which was filed on Apr. 14, 2018 and is entitled "Hands On Laboratory and Demonstration Equipment with a Hybrid Virtual Environment, Along With Their Methods of Use", which is also commonly-owned and incorporated in its entirety by reference.

FIELD OF THE SUBJECT MATTER

The field of the subject matter is laboratory and demonstration equipment that is designed to be hands on, wherein the full experience is demonstrated and utilized in both a live action environment and a hybrid virtual or an augmented environment.

BACKGROUND

Learning is maximized when theory and practice are seamlessly integrated and when spatially and temporally coordinated visual, auditory, and tactile sensory learning experiences reinforce each other. Nowhere is this more evident than in traditional hands-on laboratory classes, industry internships, and mentored research projects where students apply theoretical concepts, carry out experiments/procedures, and analyze data in an active, guided, and often open-ended manner using their eyes, ears, and hands. Despite being prized by STEM students, employers, and academic research institutions such experiences are highly resource intensive and thus a challenge to offer in a scalable manner. For example, dangerous, long, complicated, or expensive experiments are often difficult to offer.

Despite the fact that both learning in general and the scientific method in particular involve iterative refining of our conceptual understanding of our environment, in traditional lab classes students are often not free to make mistakes, redo experiments, or iteratively refine hypotheses to attain mastery over techniques and concepts. The long hours and lack of scheduling flexibility in traditional face-to-face labs also reduces STEM participation by low-income and underrepresented minority students because they often work while in school. On-demand dynamic visualization of the molecular or microscopic basis for a macroscopic laboratory observation is often absent in traditional textbooks, lectures, and lab activities. Finally, lab instructors, industry trainers, and research mentors have limited time with students; this prevents them from correcting the most nuanced types of mistakes that students often make when learning new methods.

Universities and graduate schools who provide STEM training to students balance several goals: first, they must provide an environment where key lab skills can be practiced and ultimately learned; second, they must keep overall costs as low as possible, while providing the necessary resources, and third, they need to ensure that the students and the lab environment are as focused and safe as possible.

Conventional lab training involves students working with actual equipment, such as beakers, pipettes, chemicals, heat sources, and other materials that may be unpredictable in the hands of inexperienced science students. Depending on the experiments, there may be safety issues. But, at the very least, experiments may need to be run more than once by a student or team, supplies can be damaged or can break, and the costs of materials can be expensive.

There are some teaching environments that are abandoning working with actual equipment and hands-on experiments and opting instead for a virtual environment or an animated environment, where the students essentially watch the experiments take place and may participate in the lab experience by moving their hands, eyes, voice, or head. In some virtual systems, the students hand movement operates a robot or robotic device that is actually doing the work.

There is a lot of work in this field in the area of surgery simulation and training or the use of virtual/augmented reality in actual surgeries. For example, U.S. Pat. No. 9,251,721 discloses the use of virtual reality coupled with physical models to simulate surgical procedures. The patent and its related patents and patent applications discuss that the physical model of a subject object needs to be penetrable through an external or internal surface. The patent also discloses that one of the objects of the invention is to allow the user to "see" through the use of a virtual model parts of the body that are either internal or "blind" to the user ("internal or hidden features of the object") through normal surgical processes. In addition, the patent discloses a "virtual representation" that is presented to the user that contains the virtual representations of the internal organs of the body, the surgical instruments, and any additional items not visible to the user in ordinary circumstances. There is still a need to utilize augmented reality viewing/simulations in lab settings.

Nearly 95% of a biochemistry/molecular biology researcher's time at the bench is spent interfacing with test-tubes, their pipetteman, tip racks, and stocks of various solutions/reagents. If one could provide the sensory experience of handling these lab tools, while allowing them to cross the boundary between the real and virtual world of an instructional simulation, an entirely new class of truly "hands-on" hybrid virtual labs would become accessible. Students would come close to getting a fully hands-on scientific learning experience without any of the traditional resource constraints that prevent universities and other schools from providing all students with all the resources they might want for a given lab course.

For example, it would be advantageous if science lecture and lab courses could be redesigned to use virtual lab modules effectively to either improve student engagement with the course content and/or to reduce bottlenecks/resource constraints that typically prevent institutions from offering more class sections. However, a major issue with conventional virtual reality tools and instructional lab modules is the lack of authentic tactile sensory experiences for the user. Virtual reality (VR), augmented reality (AR), and mixed reality (MR) applications have progressed rapidly in the past 5 years. However, although there are now many games, experiences, and hardware controllers for non-instructional applications, the use of VR, AR, and MR in educational settings has been limited. In higher education instructional laboratories where students must work with the actual physical tools of their work, this is mainly because virtual labs don't offer an authentic "hands-on" experience to these student users.

One route of providing the hands-on experience that companies are developing is the use of haptic gloves associated software and similar technology, where a student puts on a glove laden with sensors and actuators that sense the users hand position and create a "passable" virtual representation of the users hand within the virtual world. Real-time software then calculates a set of resistive forces which when applied onto the user's hand would authentically recreate the tactile resistance that the virtual world should induce upon the user at a given moment in the virtual reality experience. These forces are then passed to the actuators on the haptic glove in the real world to recreate that resistance and tactile sensory experience for the user. When the student moves his or her hands with the gloves on, the student sees an interactive experience through a virtual reality portal. While this is a terrific advancement in the broader field of augmented/virtual reality, and may provide—at the coarsest levels an somewhat authentic replication of the tactile resistance that users might experience when performing laboratory experiments (e.g. grasping a graduated cylinder) it doesn't provide students with finely-grained tactile sensory feedback from the virtual world or the ability to really feel the tools they will be using—how those tools are manipulated, how solutions are transferred, how test tubes are opened, culture plates are manipulated, how components are mixed/added to one another, etc. The "feel" of tools in a student's hand is a necessary component of learning how to work in a lab environment.

Schell Games has developed a virtual lab called HoloLab Champions that simulates several experiments and enables the user to develop laboratory skills and learn best practices. However, the user has to hold a paddle-like controller in his or her hands in order to interact with the virtual world (i.e. pick up and manipulate items or use equipment). There is no authentic tactile sensation of picking up a beaker or weighing out a powder. The user does not pick up beakers or interface with other equipment by hand, but instead uses the controller. Prior Art FIG. 1 shows a brief comparison of several tracking approaches which can help resolve this problem. In particular, tracking technologies allow the position and state of real objects (e.g. fake guns, golf clubs, baseball bats, ping pong rackets, etc.) to be detected and passed into a virtual reality environment even as the user is holding and manipulating those objects in actual reality.

To date, there isn't anything of this sort adapted specifically for training undergraduate students in science education by passing real scientific laboratory tools (e.g. pipettemen, test tubes, graduated cylinders, and other equipment) that are held by a user and tracked using any of the above-listed tracking technologies into the virtual world. Such an approach which we call "virtualization of lab tools" has the advantage of providing fine-grained and completely realistic tactile sensory feedback to the user directly from the real physical scientific tool they are holding, while also allowing the physical scientific tool to pass into the virtual world and properly interact with all the exclusively-virtual instruments and reagents of the virtual reality experience (e.g. solutions to be pipetted from tube to tube, etc).

A common argument against replacing traditional science labs with virtual labs is that virtual labs can't provide certain essential tactile sensory feedback to students. While there are clearly some practical laboratory skills that can only be acquired by holding, manipulating, and gaining physical familiarity with laboratory tools, there are currently few studies which clearly identify what these skills are and how tool manipulation facilitates learning. This stems largely from the challenges involved in deconvoluting the impact of tactile sensory feedback from all the other differences that exist between virtual and traditional lab experiences. The methods developed here will enable controlled studies (ie. VR with hands-on lab tools vs. VR only w/o lab tools vs. traditional hands-on lab) which can more directly address this important issue and define exactly how and when tactile sensory feedback is essential to learning in the sciences.

To address the shortcomings of conventional technology, a hybrid virtual student experience has been developed where positional tracking markers/sensors are placed on or built into the laboratory items and tools that need to be actually manipulated by the user (e.g. pipettemen and sample tube) in order to preserve the real feel of the manipulated object while eliminating or minimizing the costs associated with providing authentic haptic force feedback to the user. In an idealized use case, labs and schools who cannot afford to replace existing non-functional equipment can utilize tracking markers/sensors to virtualize the non-functional lab equipment and make it functional for instructional purposes within a virtual learning environment without having to actually fix or maintain it.

SUMMARY OF THE SUBJECT MATTER

Systems and methods for utilizing laboratory equipment in a hybrid reality environment, are contemplated herein and include: at least one piece of laboratory equipment having at least one feature, wherein the at least one piece of laboratory equipment is tracked; a tracking module for tracking a position and an orientation of the at least one piece of tracked laboratory equipment; a virtual model, stored in a memory, comprising at least one 3-D virtual representation of the at least one feature of the at least one piece of laboratory equipment; an experimentation module that: accesses the virtual model stored in the memory; receives input from the tracking module regarding the position and the orientation of the at least one piece of tracked laboratory equipment; determines, based on the input from the tracking module, a corresponding interaction between the at least one piece of laboratory equipment and at least one additional piece of laboratory equipment, at least a portion or part of a user, or a combination thereof; determines a consequence of the corresponding interaction; and renders, to a display, a hybrid representation comprising a particular set of the at least one 3-D virtual representation, at least a part or portion of the user, the corresponding interaction, the consequence of the corresponding interaction, or a combination thereof.

Additional systems and methods for utilizing laboratory equipment in a hybrid reality environment are contemplated herein and include: at least one first piece of laboratory equipment having at least one feature, wherein the at least one piece of laboratory equipment is tracked; a tracking module for tracking a position and an orientation of the at least one piece of tracked laboratory equipment; a virtual model, stored in a memory, comprising at least one 3-D virtual representation of at least one feature of an additional piece of laboratory equipment, at least a portion of a part of a user, or a combination thereof; an experimentation module that: accesses the virtual model stored in the memory; receives input from the tracking module regarding the position and the orientation of the at least one first piece of tracked laboratory equipment; determines, based on the input from the tracking system, a corresponding interaction between the at least one piece of laboratory equipment and at least one additional piece of laboratory equipment, at least a portion or part of a user, or a combination thereof; determines a consequence of the corresponding interaction; and renders, to a display, a hybrid representation comprising the physical visual representation of the at least one piece of tracked laboratory equipment, at least one 3-D virtual representation, at least a part or portion of the user, the corresponding interaction, the consequence of the corresponding interaction, or a combination thereof.

A piece of laboratory equipment for use in a hybrid reality environment or augmented virtual reality environment is also included that comprises at least one piece of laboratory equipment having at least one feature, wherein the at least one piece of laboratory equipment is tracked; at least one marker that is coupled with the at least one piece of laboratory equipment; and a tracking module for tracking a position and an orientation of the at least one piece of tracked laboratory equipment, wherein the tracking module accesses the at least one marker.

BRIEF DESCRIPTION OF THE FIGURES

Prior Art FIG. 1 shows a comparison of Various Tracking approaches used in VR/AR/MR/XR technologies. One criteria of interest for this work is the spatial resolution of the tracking approach.

FIG. 6 shows contemplated systems and methods.
FIG. 7 shows contemplated systems and methods.

DETAILED DESCRIPTION

Figure 2:
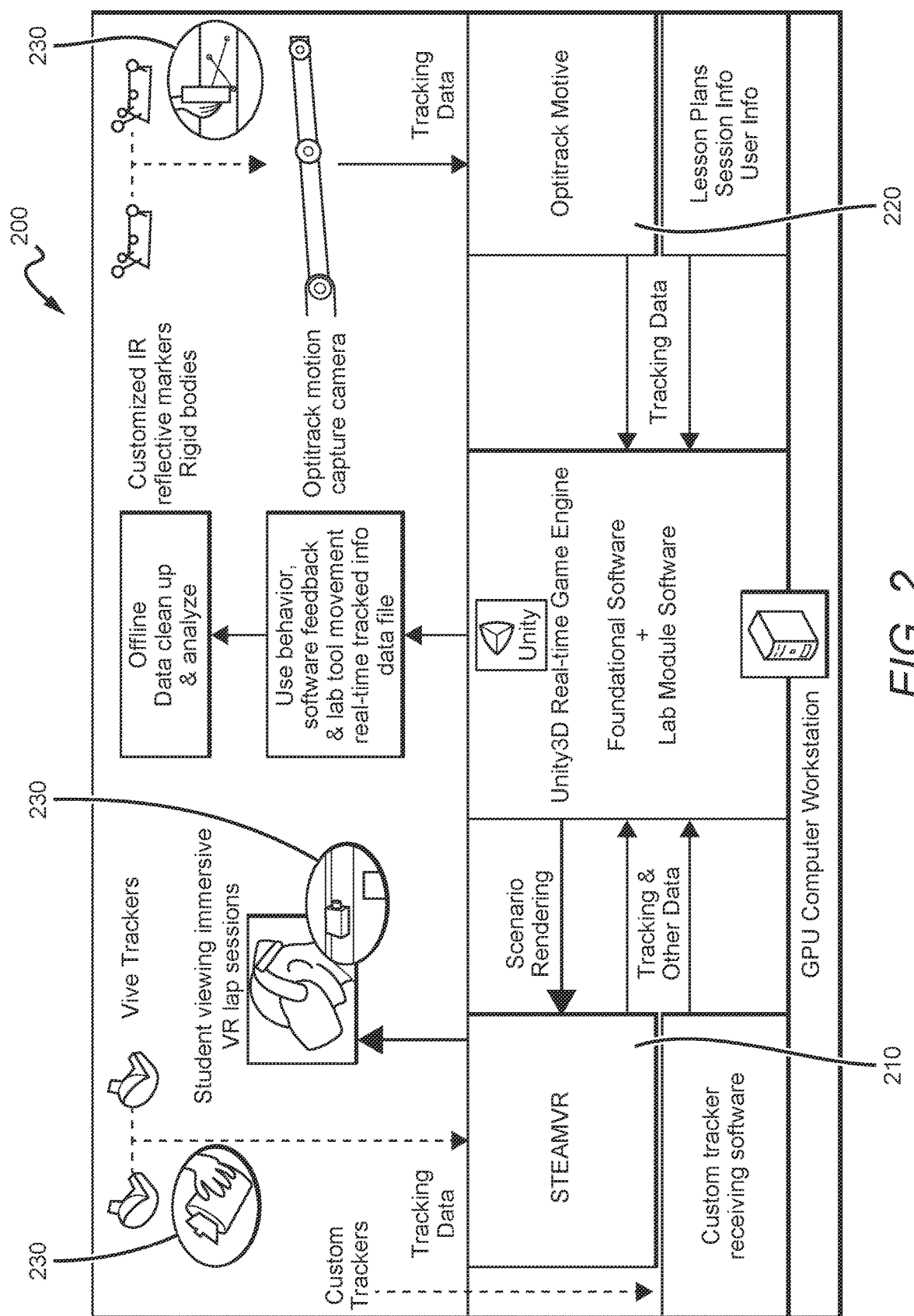
FIG. 2 includes a diagram showing the various Hardware and Software components along with data flow. Active tracking and HMD display using SteamVR's Lighthouse 2.0 tracking system (left). Passive tracking of retroreflective markers using an Optitrack IR camera. Small circles show images of students holding the "virtualized lab tools" we've already developed. Green indicated data output. Dashed arrows indicate wireless or optical data transmission.

Specifically, current contemplated embodiments resolve many of the issues of conventional technologies through the creation and use of novel hardware and software, which can provide an authentic tactile sensory experience of doing wet-lab scientific research. In a contemplated embodiment, an "augmented/virtualized-pipetteman" can be used in augmented or virtual reality learning modules for biochemistry, chemistry, and molecular biology courses.

Some additional goals include: developing and utilizing high-precision motion capture methods to track the positions, orientations, and states of the laboratory tools most-often directly manipulated by trainees in chemistry and biochemistry (e.g. pipettemen, test tubes, beakers, etc.); creating virtual reality chemistry and biochemistry experiences which use this tracking data to provide students with both real-time macroscopic feedback on their laboratory performance as well as just-in-time dynamic molecular/microscopic visualizations illustrating key concepts relevant to the simulated tasks immediately at hand; and assessing the impact of such targeted-immersion hands-on virtual reality lab experiences on student learning, self-efficacy, and intrinsic motivation.

Accordingly, a hybrid virtual student experience has been developed where sensors are placed on or built into the items that need to be actually manipulated by the user (e.g. pipettemen and sample tube) in order to preserve the real feel of the manipulated object while avoiding the need to replicate the actual device or emulate the force feedback from the virtual world using a haptic glove.

Specifically, systems and methods for utilizing laboratory equipment in a hybrid reality environment, are contemplated herein and include: at least one piece of laboratory equipment having at least one feature, wherein the at least one piece of laboratory equipment is tracked Systems and methods for utilizing laboratory equipment 600 in a hybrid reality environment, are contemplated herein, are shown in FIG. 6 and include: at least one piece of laboratory equipment 610 having at least one feature, wherein the at least one piece of laboratory equipment is tracked; a tracking module 620 for tracking a position and an orientation of the at least one piece of tracked laboratory equipment; a virtual model 630, stored in a memory, comprising at least one 3-D virtual representation of the at least one feature of the at least one piece of laboratory equipment; an experimentation module 640 that: accesses 650 the virtual model stored in the memory; receives 660 input from the tracking module regarding the position and the orientation of the at least one piece of tracked laboratory equipment; determines 670, based on the input from the tracking module, a corresponding interaction between the at least one piece of laboratory equipment and at least one additional piece of laboratory equipment, at least a portion or part of a user, or a combination thereof; determines 680 a consequence of the corresponding interaction; and renders 690, to a display, a hybrid representation comprising a particular set of the at least one 3-D virtual representation, at least a part or portion of the user, the corresponding interaction, the consequence of the corresponding interaction, or a combination thereof.

Additional systems and methods 700 for utilizing laboratory equipment in a hybrid reality environment are contemplated herein, shown in FIG. 7, and include: at least one first piece of laboratory equipment 710 having at least one feature, wherein the at least one piece of laboratory equipment is tracked; a tracking module 720 for tracking a position and an orientation of the at least one piece of tracked laboratory equipment; a virtual model 730, stored in a memory, comprising at least one 3-D virtual representation of at least one feature of an additional piece of laboratory equipment, at least a portion of a part of a user, or a combination thereof; an experimentation module 740 that: accesses 750 the virtual model stored in the memory; receives 760 input from the tracking module regarding the position and the orientation of the at least one first piece of tracked laboratory equipment; determines 770, based on the input from the tracking system, a corresponding interaction between the at least one piece of laboratory equipment and at least one additional piece of laboratory equipment, at least a portion or part of a user, or a combination thereof; determines 780 a consequence of the corresponding interaction; and renders 790, to a display, a hybrid representation comprising the physical visual representation of the at least one piece of tracked laboratory equipment, at least one 3-D virtual representation, at least a part or portion of the user, the corresponding interaction, the consequence of the corresponding interaction, or a combination thereof.

A piece of laboratory equipment for use in a hybrid reality environment or augmented virtual reality environment is also included that comprises at least one piece of laboratory equipment having at least one feature, wherein the at least one piece of laboratory equipment is tracked; at least one marker that is coupled with the at least one piece of laboratory equipment; and a tracking module for tracking a position and an orientation of the at least one piece of tracked laboratory equipment, wherein the tracking module accessed the at least one marker.

As mentioned throughout this specification, a hybrid reality environment means that real world lab tools, equipment, and components that are conventionally found in academic and industrial labs can be modified or supplemented so that they can be viewed and manipulated in a virtual environment. In some contemplated embodiments, all of the equipment, the user's hands, the other experimental materials are digitally converted into virtual reality. In other contemplated embodiments, some of the components, lab equipment, and user's hands/arms are shown visually as they physically are in real life, and other components, such as liquids, powders, expensive equipment, hard-to-find materials, or combinations thereof are shown virtually in the environment, so that the environment is a hybrid digital/physical environment. However, it should be understood that labs, schools, and universities do not need to spend thousands or hundreds of thousands of dollars on special virtual reality tools and equipment (e.g. haptic gloves), but instead they can purchase sensors or other suitable markers/software and utilize equipment that they already have on hand together with the billions of "sensors" or nerves that the user will already have in their own hand.

In contemplated embodiments, any of the tools in lab that need to be picked up, used, or otherwise manipulated by the student, worker, or professor can be retrofitted or initially constructed and built with suitable hardware and devices that allow the actual position and state of the tools to be detected by a computer and allow transmission of information to a computer or other computing environment that operates the virtual reality experience for the user/users.

As used herein, the phrase "at least one piece of laboratory equipment having at least one feature, wherein the at least one piece of laboratory equipment is tracked" or the phrase "at least one first piece of laboratory equipment having at least one feature, wherein the at least one piece of laboratory equipment is tracked" means any suitable or available physical piece of laboratory equipment (or suitably authentic replica thereof, such as a piece of laboratory equipment fabricated from plastic or composite) that someone may use or need to be trained on, including glassware (or plastic replicas of glassware with tracking markers), pipettes, beakers, weighing equipment/scales, analytical equipment and instrumentation, or any other suitable piece of equipment. In each of these instances, a contemplated piece of laboratory equipment is tracked by a suitable tracking module. In contemplated embodiments, this or these pieces of laboratory equipment may be actual physical equipment, physical equipment comprising materials other than the original materials, such as plastic or composite material, may be virtual equipment, or may be a combination thereof. As stated earlier, with new students or with expensive equipment, the equipment may be rendered out of other materials, so that if the student drops the equipment or handles it too roughly, the equipment won't be broken or lost. In some embodiments, the equipment may be 3-D printed, bought, or prepared another way.

In contemplated embodiments, the at least one piece of laboratory equipment and/or the at least one piece of additional laboratory equipment may comprise at least one laboratory solid material, at least one laboratory liquid material, at least one laboratory gaseous material, or a combination thereof, wherein the at least one piece of laboratory equipment, laboratory solid material, laboratory liquid material, laboratory gaseous material, or a combination thereof is a physical actual representation, a virtual model representation, or a combination thereof.

Contemplated laboratory solid materials may comprise equipment, but it may also comprise powders, granules, chunks, crystals, or any other solid material, chemical or compound found in the laboratory or brought into the laboratory for tests or testing. Contemplated laboratory liquid material may comprise any suitable liquid, including water, liquid chemicals, liquid brines or broths, and any other liquid found in the laboratory or brought into the laboratory for tests or testing. Contemplated gaseous material may comprise any suitable gas or gaseous material that is found in the laboratory or brought into the laboratory for tests or testing.

As used herein, the phrase "physical actual representation" means generally a digital representation of the user's actual hand, arm, finger, or other part or portion. It should be understood that contemplated systems may show the user a mixture of animated, virtual reality and the user's actual hand, or the actual beaker, or the actual instrument. The augmented reality may be a blended or mixed view for the user, depending on the needs of the experiment and the items available in the laboratory setting.

As used herein, the phrase "a tracking module for tracking a position and an orientation of the at least one piece of tracked laboratory equipment" means that a contemplated tracking module has the ability to track a position and an orientation of at least one piece of tracked laboratory equipment for the purpose of allowing the user to visualize it in real time in the hybrid virtual reality environment or space. A contemplated tracking module may comprise a number of components, including equipment sensors, markers, or transmitters, receivers, processing software, or a combination thereof. As part of this contemplated module, physical markers with either non-degenerate marker geometries or digitally encoded identities are utilized by the imaging/tracking software to uniquely recognize each lab tool. For geometrically-encoded lab tool identification the it is critical to ensure that markers don't look too much like one another, and thus "confuse" the imaging software. Contemplated markers are considered to be providing either passive or active tracking. Active tracking is digital and involves using IR sensors as the markers on the lab tools, which works as long as you can provide power to the markers (which means bulky markers—often preventing utility for tracking smaller lab tools).

As used herein, the phrase "a virtual model, stored in a memory, comprising at least one 3-D virtual representation of at least one feature of an additional piece of laboratory equipment" means the environment where the at least one tracked piece of laboratory equipment is shown, along with other components of the virtual environment. The experiments and some of the equipment and lab components that are designed to be fully virtual (not physically located in the actual lab) are also stored in a contemplated virtual model, so that they can be introduced into the hybrid virtual environment and utilized by the user. A contemplated virtual model may also comprise a portion or a part of the user, such as the user's hand/hands, fingers, arm or arms, or other suitable portions or parts of the user.

In some contemplated embodiments, an experimentation module is utilized, wherein the experimentation module functions to: access the virtual model stored in the memory; receive input from the tracking module regarding the position and the orientation of the at least one piece of tracked laboratory equipment; determine, based on the input from the tracking system, a corresponding interaction between the at least one piece of laboratory equipment and at least one additional piece of laboratory equipment; determine a consequence of the corresponding interaction; and render, to a display, a hybrid representation comprising the at least one 3-D virtual representation, at least a part or portion of the user, the corresponding interaction, the consequence of the corresponding interaction, or a combination thereof.

In other embodiments, a contemplated experimentation module is utilized, wherein the experimentation module functions to: access the virtual model stored in the memory; receive input from the tracking module regarding the position and the orientation of the at least one first piece of tracked laboratory equipment; determine, based on the input from the tracking system, a corresponding interaction between the at least one piece of laboratory equipment and at least one additional piece of laboratory equipment; determine a consequence of the corresponding interaction; and render, to a display, a hybrid representation comprising the physical visual representation of the at least one piece of tracked laboratory equipment, at least one 3-D virtual representation, at least a part or potion of the user, the corresponding interaction, the consequence of the corresponding interaction, or a combination thereof

EXAMPLE: AUGMENTED-REALITY OR VIRTUALIZED PIPETTEMAN

In one contemplated embodiment, a "virtualized pipetteman" or an "augmented-virtuality pipetteman" comprises a regular pipetteman that is retrofitted or built with hardware (sensors, transmitters, gyroscopes, and accelerometers) capable of detecting and transmitting information on the status of the pipetteman to an app-based virtual/augmented-reality program/learning module. The user's headgear or head-mount display (mobile phone or PC-integrated imaging device) will integrate the actual pipetteman's position, orientation, and status (full of sample, empty, or ejecting liquid) and project an image of this pipetteman into the virtual reality world being shown to the user through their headgear. In some contemplated embodiments, there can also be a special test-tube and tip-rack provided, which will allow users to reload virtual tips and put virtual samples into test tubes that they are actually holding and opening the caps of in their real hands. Contemplated hardware will be compatible with tools/instruments/assets already developed by other traditional virtual reality companies, as well as any other 3D-based gaming engine/platform. Drivers and APIs are contemplated that meet the demands of this contemplated and new technology.

The retrofitted nature of the contemplated pipetteman modification will allow a wide range of pipettes to be "virtualized" enabling a wide variety of different pipettes to be handled and experienced by users carrying out the virtual experiments and activities. The use of the contemplated technology will allow more colleges and universities to offer more sections of science labs without compromising on student exposure to "hands-on" experimentation—when a virtual but "tactily" authentic version of such experiments is warranted. This will benefit many molecular biology/biochemistry/chemistry courses and students worldwide as they will be able to get real-time feedback on their lab procedure at the level of each individual pipetting step and will be able to perform virtual experiments with authentic tactile feedback as many times as might be necessary to gain mastery over the methods and procedures being learned.

Contemplated embodiments include hardware and software that allow a standard real-life pipetteman to be retrofitted and "virtualized" into an intermediary passable tool that interfaces between student researchers and a virtual world filled with other virtualized hands-on lab tools as well as fully virtual laboratory equipment. Users will receive detailed feedback on every step of the experimental procedure they perform within the virtual experience. To date, conventional technologies have focused on developing haptic gloves that can emulate interactions with any fully virtual object at a great hardware cost for the user and a large decrease in the authenticity of tactile sensory feedback provided to the user. Less expensive but narrower-scope approaches such as retrofitting particular lab tools with tracking markers so that they can both be manipulated naturally by an actual human, and so that those manipulations can be tracked and interfaced with a virtual world of experiments and instruments to provide automated feedback to the user on what they might be doing incorrectly in their experiments has been lacking. By bridging the gap between the virtual and real worlds in a cost-effective manner and with a narrower scope for the interactions of interest by "virtualizing" only the important elements that are most often physically touched by a user (e.g. pipetteman, tubes, beakers, etc), many barriers to student learning can be minimized or erased altogether.

Improvements in student engagement and a more realistic sensation of how to carry out experiments is needed in many biochemistry, molecular biology, and chemistry courses. This innovative technology will provide this much-needed resource. Teams of faculty will then be able to build up the fully or partially-virtual tools/assets required to build innovative virtual and augmented instructional laboratory experiences knowing that students will be manipulating only a small subset of real scientific tools, using them to interface with these entirely or partially-virtual instruments in specific ways, and also receiving the completely realistic "hands-on" tactile sensory feedback from them for which traditional labs are so deservedly prized. Teaching laboratory skills is timeconsuming and resource intensive. Students must make mistakes in order to learn but this costs time and money. Augmented reality and virtual reality systems might well address this however thoughtful hardware-software integration is necessary in order to provide students with an authentic simulated laboratory research experience.

The hands-on VR approach we describe herein enables novel technology-driven approaches to teaching, learning, and training not only at universities but also in industry settings. This approach takes active learning to an entirely new level. We predict that by virtue of the decreased cost of hands-on virtual labs all science courses may be able to include effective lab components. The digital assets, methods, and workflows described generally herein will also facilitate future content creation by non-expert programmers and digital artists allowing faculty in diverse fields to quickly create their own hands-on VR experiences. Finally, by providing students with additional options for how and when to consume laboratory course content, such hands-on VR lab experiences may help address the issue of STEM persistence of underrepresented minority students—an important national priority.

FIG. 2 includes a diagram 200 showing the various hardware and software components along with data flow. Active tracking and head-mount display (HMD) display using SteamVR's Lighthouse 2.0 tracking system (210). Passive tracking of retroreflective markers using an Optitrack IR camera 220. Small circles 230 show images of students holding the "virtualized lab tools" we've already developed. Green indicated data output. Dashed arrows indicate wireless or optical data transmission.

Figure 3:
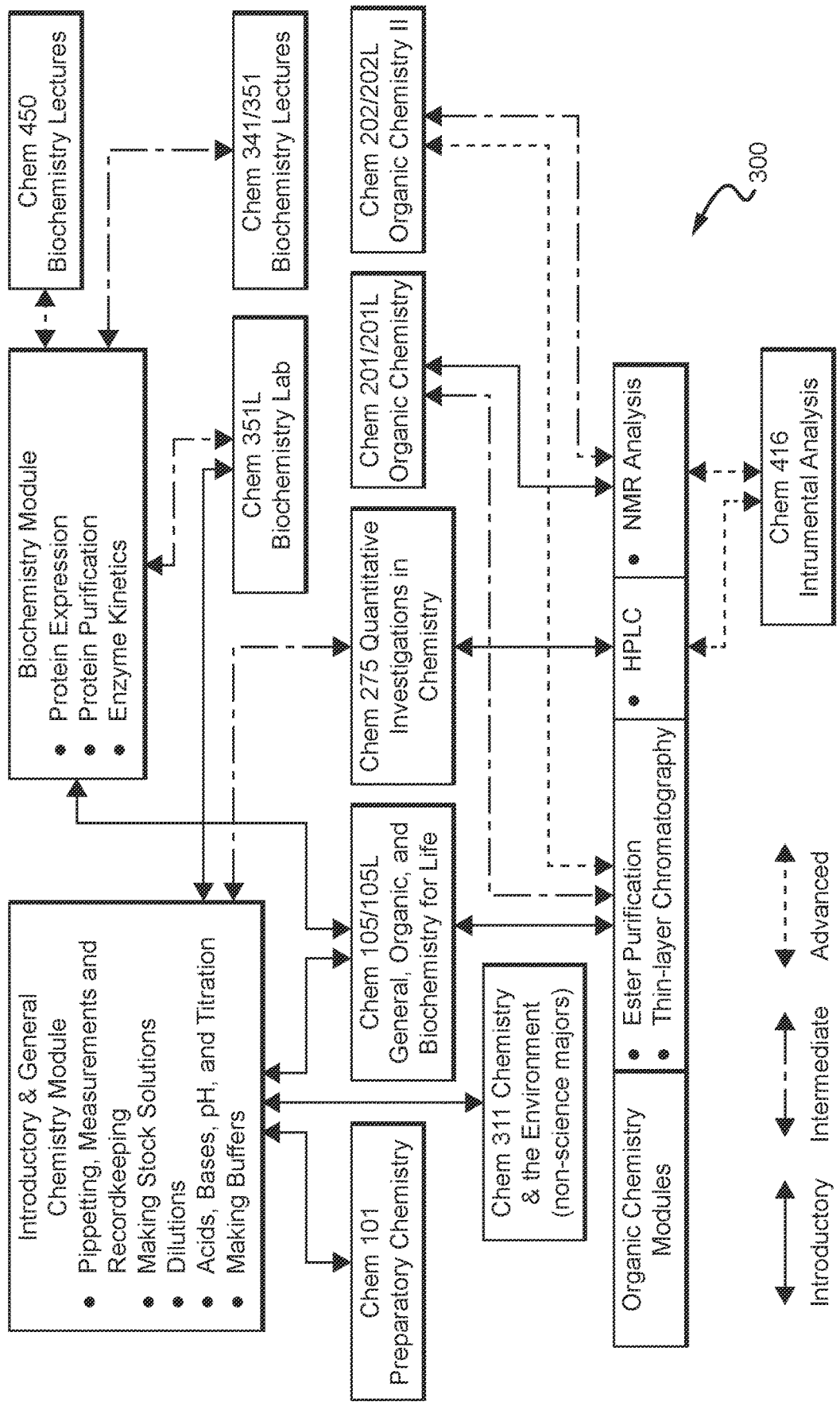
FIG. 3: Illustration of the various "hands-on" VR Lab Modules/sub-modules to be made and the classes in which they will be implemented/tested. Blue, red, and green arrows indicate the level (introductory, intermediate, or advanced) at which the module will be implemented within each class.

FIG. 3 shows an illustration 300 of the various "hands-on" VR Lab Modules/sub-modules that are contemplated and the classes in which they will be implemented/tested. Blue (solid), red (short dash), and green (long, bold dash) arrows indicate the level (introductory, intermediate, or advanced) at which the module will be implemented within each class.

Figure 4:
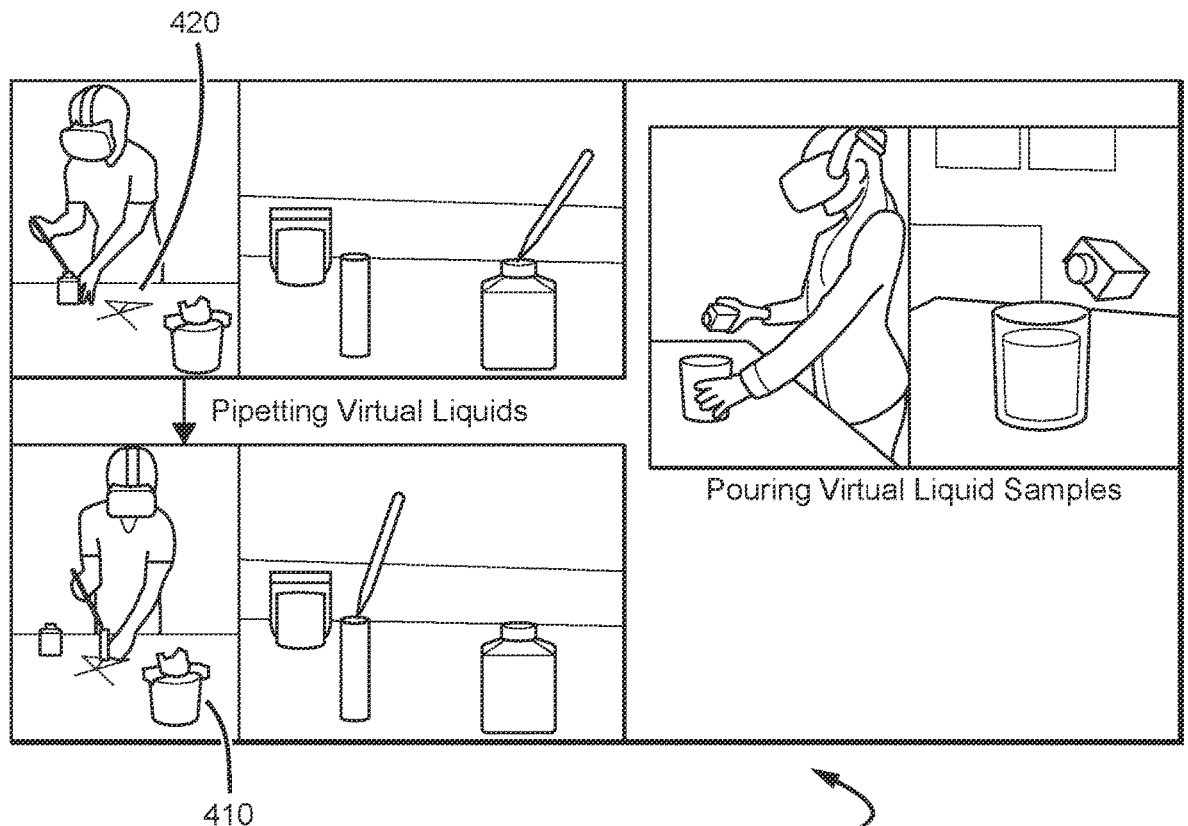
FIG. 4: Each of the three dual-view images in this panel contains a physical-world (left) and a virtual-world perspective (right) of a student using virtualized lab tools. The top left dual-view shows the student picking up virtual liquid from a passively tracked and virtualized 250 mL reagent stock container using a passively-tracked and virtualized pipetteman (in this case a rainin pipette to which we've mounted retroreflective markers on the pipette shaft, plunger, and tip ejector with additional markers 420 included). At bottom left the student is transferring the virtual liquid they just picked up into a virtualized 50 mL container. At top right, a student is being shown pouring liquid stock reagent from the passively-tracked 250 mL container into an actively-tracked beaker (the Vive Tracker unit 410 is mounted on top of the beaker).

FIG. 4 shows students using simple virtualized lab tools 400. Each of the three dual-view images in this panel contains a physical-world (left) and a virtual-world perspective (right) of a student using virtualized lab tools. The top left dual-view shows the student picking up virtual liquid from a passively tracked and virtualized 250 mL reagent stock container using a passively-tracked and virtualized pipetteman (in this case a rainin pipette to which we've mounted retroreflective markers on the pipette shaft, plunger, and tip ejector). At bottom left the student is transferring the virtual liquid they just picked up into a virtualized 50 mL container. At top right, a student is being shown pouring liquid stock reagent from the passively-tracked 250 mL container into an actively-tracked beaker (the Vive Tracker unit is mounted on top of the beaker).

Figure 5:
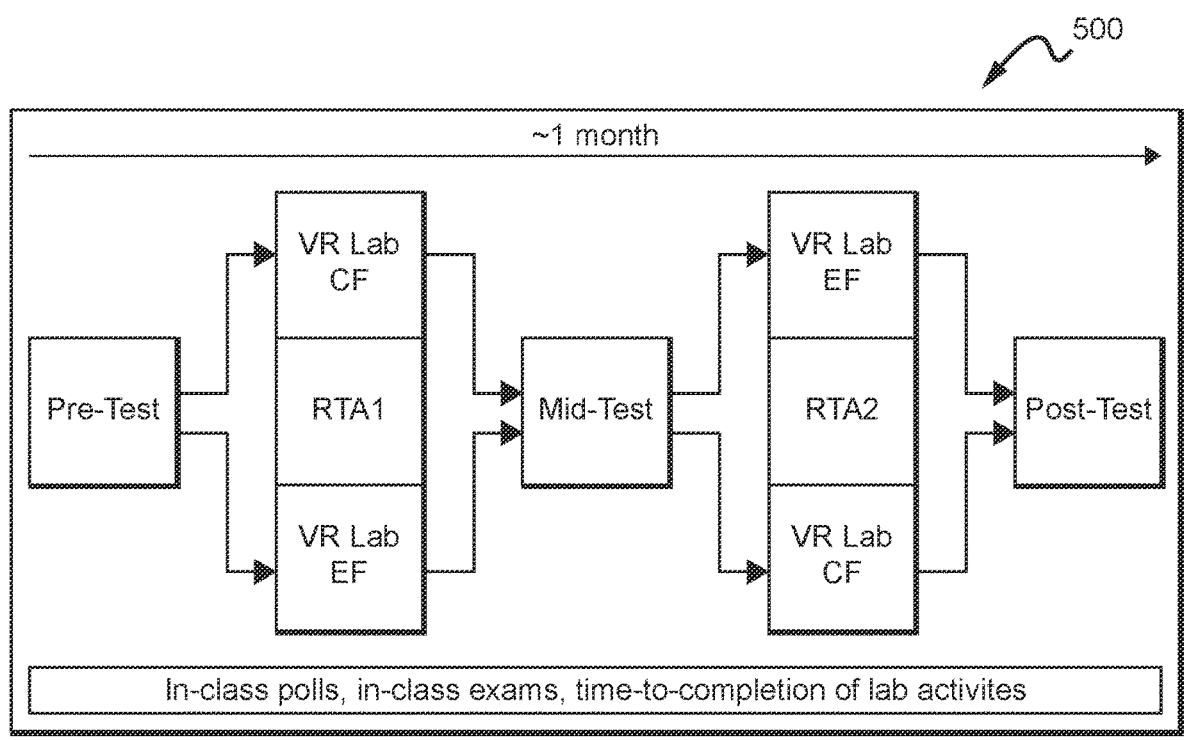
FIG. 5: In each class in which the "hands-on" virtual labs are to be tested students will be randomly assigned into control-first (CF) and experiment-first (EF) categories. All students will receive a pre-test, then CF students will be exposed to the control VR module (i.e. either without authentic tactile sensory feedback from real lab tools or without dynamics molecular visualizations) while EF students receive the experimental VR module. Students will be assessed using real-time assessment within the VR module but then will perform a mid-test outside of the VR module as well. Finally, the students will switch activities, additional real-time assessments will be made, and after completion of the second version of the lab a post-test will be administered. This procedure will be used for most of the VR modules we will test. For some classes (i.e. lab classes) additional metrics of student performance will also be used for assessment (shown at bottom).

FIG. 5 shows an assessment strategy 500 sequence to be used to demonstrate efficacy of the hands-on virtual labs contemplated. In each class in which the "hands-on" virtual labs are to be tested students will be randomly assigned into control-first (CF) and experiment-first (EF) categories. All students will receive a pre-test, then CF students will be exposed to the control VR module (i.e. either without authentic tactile sensory feedback from real lab tools or without dynamics molecular visualizations) while EF students receive the experimental VR module. Students will be assessed using real-time assessment (RTA) within the VR module but then will perform a mid-test outside of the VR module as well. Finally, the students will switch activities, additional real-time assessments will be made, and after completion of the second version of the lab a post-test will be administered. This procedure will be used for most of the hands-on VR modules we will test. For some classes (i.e. lab classes) additional metrics of student performance will also be used for assessment (shown at bottom).

Thus, specific embodiments and methods of use of hands on laboratory and demonstration equipment with a hybrid virtual environment have been disclosed. It should be apparent, however, to those skilled in the art that many more modifications besides those already described are possible without departing from the inventive concepts herein. The inventive subject matter, therefore, is not to be restricted except in the spirit of the disclosure herein. Moreover, in interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A system for utilizing laboratory equipment in a hybrid reality environment, comprising:
at least two pieces of laboratory equipment having at least one feature;
at least one optical tracking module for optical tracking of a position and an orientation of the at least two pieces of virtualized laboratory equipment, wherein the optical tracking enables a detection of at least one functionally relevant corresponding interaction between at least two of the at least two pieces of virtualized laboratory equipment;
a plurality of uniquely-identifiable sets of markers that are coupled to the at least two pieces of virtualized laboratory equipment, wherein the marker comprises at least one non-degenerate marker geometry that is passively tracked or at least one digital encoded identity that is actively tracked, wherein each piece of virtualized laboratory equipment is coupled with the plurality of uniquely-identifiable set of markers, and wherein the set of markers and the at least two pieces of laboratory equipment are entirely optically tracked;
a virtual model, stored in a memory, comprising at least two 3-D virtual representations of the two pieces of virtualized laboratory equipment and the plurality of uniquely-identifiable sets of markers that are coupled to the at least two pieces of virtualized laboratory equipment;
an experimentation module that:
accesses the virtual model stored in the memory;
receives input from the at least one optical tracking module regarding the position and the orientation of the at least one two pieces of virtualized laboratory equipment;
determines, based entirely on the input from the at least one optical tracking module, the at least one functionally relevant corresponding interaction between the at least two pieces of virtualized laboratory equipment, at least a portion or part of a user, or a combination thereof;
determines a consequence of the at least one functionally relevant corresponding interaction; and
renders, to a display, a hybrid representation comprising a particular set of the at least two 3-D virtual representations, at least a part or portion of the user, the at least one functionally relevant corresponding interaction, the consequence of the at least one functionally relevant corresponding interaction, or a combination thereof.

2. The system of claim 1, wherein the hybrid reality environment includes an augmented virtual reality environment.

3. The system of claim 1, further comprising at least one marker that is coupled with the at least two pieces of laboratory equipment; and
   wherein the tracking module accesses the at least one marker.

* * * * *